United States Patent [19]

Bourgault

[11] 4,387,772
[45] Jun. 14, 1983

[54] FARMING IMPLEMENT AND ELEVATION CONTROL THEREFOR

[76] Inventor: Joseph L. Bourgault, P.O. Box 202, Barbier Dr., St. Brieux, Saskatchewan, Canada, S0K 3V0

[21] Appl. No.: 302,055

[22] Filed: Sep. 14, 1981

[30] Foreign Application Priority Data

May 25, 1981 [CA] Canada .................................. 378252

[51] Int. Cl.³ ...................... A01B 63/16; A01B 73/00
[52] U.S. Cl. ...................................... 172/311; 74/105; 172/401; 172/413; 280/43.13; 280/43.23
[58] Field of Search ............... 172/311, 456, 413, 400, 172/401, 402, 421; 280/43.13, 43.23; 74/105, 103, 102

[56] References Cited

U.S. PATENT DOCUMENTS

| | | | |
|---|---|---|---|
| 3,390,727 | 7/1968 | Weaver, Jr. et al. ................ | 172/413 |
| 3,643,745 | 2/1972 | Betulius et al. .................. | 172/466 X |
| 3,666,284 | 5/1972 | Hunter et al. ..................... | 280/43.23 |
| 3,913,683 | 10/1975 | Olsson et al. ....................... | 172/240 |
| 4,194,573 | 3/1980 | Rettkowski ......................... | 172/400 |

FOREIGN PATENT DOCUMENTS 576144  5/1933  Fed. Rep. of Germany ...... 172/311

Primary Examiner—Richard T. Stouffer
Assistant Examiner—W. H. Honaker

[57] ABSTRACT

The invention has been designed to be applied to conventional agricultural tillage equipment. The invention provides a new and improved mechanism for lifting and lowering, controlling and maintaining an accurate level of the equipment. It consists of a single hydraulic cylinder powering a scissor-type mechanical principle designed in such a configuration that the power provided by the hydraulic cylinder is transferred to each pivoting axle. The advantage of the device is that it is a relatively light weight arrangement while retaining stability and rigidity of the arrangement in operation.

10 Claims, 5 Drawing Figures

FARMING IMPLEMENT AND ELEVATION CONTROL THEREFOR

The invention relates to an improvement of lift systems applied to conventional agriculture implements, such as tillage equipment or the like cultivators. It has long been known that in order to provide a good flexibility of a device such as a deep-tillage chisel plows, it is desirable to produce the frame for a particular implement such that it can be lowered or raised with respect to the ground or with respect to its ground wheels, as the need may arise. Many systems are known for this purpose.

Broadly defined, the known systems include (a) a cable or a chain lift system using a single or numerous hydraulic cylinders as the power source. The cable, chain, and pulleys are arranged in the necessary configuration to transfer the force of the hydraulic cylinder(s) ninety degrees to create a vertical force on all of the implement axles simultaneously. The major disadvantage and reason for its very limited use is the constant stretching and lack of rigidity in the system. This results in an implement that is consistently out of level.

(b) The rockershaft lift system consists of a rigid shaft mounted horizontally on the entire width of an implement. The shaft is attached to one or a number of hydraulic cylinders and to every axle on the implement. The hydraulic cylinder forces the shaft to rotate in its fixed position simultaneously forcing the axles to pivot away from the frame of the implement allowing the operator to adjust the implement to the desired level. This method is still widely used on tillage equipment. The major disadvantages are, firstly, a twisting force on the shaft requires manufacturers to use a very large diameter shaft, raising serious questions of practicality and economic feasibility. As the widths of tillage equipment increased over the years, extensions or wings had to be folded to make a transport position possible. The nature of the joint to fold this implement where one shaft is connected to another shaft still creates a serious obstacle to proper functioning. Another disadvantage is the very limited levelability of this system, which is especially critical if the implement is being used for seed bed preparation and seed application.

(c) Because of the disadvantages of the above systems, manufacturers developed the new, commonly-used slave hydraulic system. This system eliminated all of the above-mentioned disadvantages; but inherited some new ones. The most serious being internal or external oil leaks. When this occurred, the implement would not maintain a level position, requiring immediate repair or replacement. This problem is still the single great disadvantage of the slave hydraulic system. To try to rectify the problem, cylinder manufacturers have increased quality control standards which has increased the cost of this system to the point of questionable economic feasibility. This tightening of standards and increased costs has not eliminated the serious problem of internal and external oil leaks. Another serious problem with this system is the numerous individual components of hydraulic cylinders, hydraulic hoses, hydraulic pipes and hydraulic fittings. Still another problem is the skilled labour required for the assembly and troubleshooting. Many other reasons related to economics could be added to this list which are not relevant to the patent application.

SUMMARY OF THE INVENTION

It is an object of the present invention to at least reduce some of the disadvantages of prior art as briefly referred to above.

In general terms, the present invention provides a farming implement of the type including a frame supported on ground wheel assemblies and having elevation control means for selectively raising or lowering the ground wheel assemblies relative to the frame in response to the actuation of drive means, to thus selectively adjust the spacing of the frame above the ground, each of said ground wheel assemblies being mounted at one end of a respective swing arm means, the other end of the swing arm means being pivotally secured to the frame for pivoting movement about a normally horizontal swing axis extending transversely of the frame, wherein said elevation control means includes: connection means operatively associated with said drive means for reciprocating movement generally transversely of said frame, said connection means being further associated with ground wheel lifting and lowering means to transmit the movement of the drive means to the wheel lifting and lowering means, said wheel lifting and lowering means including: two-arm dependent link means pivotally secured at one end to said connection means for relative movement about a normally generally horizontal first longitudinal axis, the other end of the two-arm link means being pivotally secured to said swing arm means for relative pivotal movement about a normally generally horizontal second longitudinal axis and about a generally horizontal second transverse axis; dependent strut link means whose one end is pivotally secured to the frame by way of a universal-type joint allowing the pivoting of the strut link means about a normally generally horizontal first joint axis extending longitudinally of the frame, and about a generally horizontal joint axis extending transversely of the frame, the other end of the strut link means being secured to said two-arm link means for relative pivotal movement about a generally horizontal and longitudinal intermediate axis; the intermediate axis being equidistantly spaced from said longitudinal axes at the ends of the two-arm link means, and from said first joint axis; whereby a generally horizontal transverse movement of the connection means is transmitted to a raising or lowering movement of respective ground wheels relative to said frame.

In accordance with another feature of the present invention, the elevation control means comprises at least two of said ground wheel lifting and lowering means spaced from each other generally transversely of the frame and operatively associated with the same connection means.

In accordance with a still further feature of the present invention, the connection means is a connection rod means comprising a normally horizontally and transversely elongated first rod having a first end operatively connected to said drive means, and a second end generally fixedly secured to a first end of a first transmitting frame, the second end of said transmitting frame having two arms defining free end portions housing pivot means of said first axis.

The basic advantage of the present invention is that it can utilize on the one hand, a single drive means, usually a hydraulic cylinder, for lifting and lowering the wheels of the implement, while retaining a good rigidity of the instant position of the ground wheels relative to the frame without the need for a heavy arrangement of mechanical parts of the device or without the need of complex hydraulic control elements required in some of the known devices of this type.

BRIEF DESCRIPTION OF THE DRAWINGS

The invention will now be described by way of preferred embodiment with reference to the accompanying simplified drawings, in which certain parts have been omitted for the sake of clarity of the description.

In the drawings.

DESCRIPTION OF PREFERRED EMBODIMENT

Figure 1:
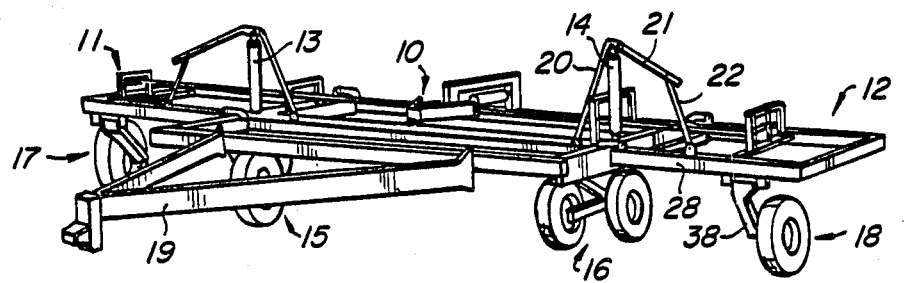
FIG. 1 is a simplified, diagrammatic view of an implement frame showing an example of an implement to which the present invention can be applied.

FIG. 1 shows a typical arrangement of the present invention associated with a farming implement frame comprised of a central portion 10 and of two wings 11, 12. Each wing is associated with an upright hydraulic cylinder 13, 14, respectively. The sole purpose of the hydraulic cylinders 13, 14 is to raise the wings 11, 12 from the extended position shown in FIG. 1 to a raised position indicated only partially and in broken lines in FIG. 2. The purpose of the raising of the wings 11, 12 is to reduce the overall width of the frame to facilitate the transportation of the implement over a road or the like. The embodiment shown in the drawings has two pairs of wheels 15, 16 supporting the central portion 10 and one wheel 17, 18 each supporting the respective wings 11, 12. A toe bar assembly 19 is secured to the front end of the central portion 10, as shown in FIG. 1.

The mechanism for transmitting the folding motion of hydraulic cylinders 13, 14, includes a strut 20, a first link 21 and a second link 22, there being a pivotal joint between the first link 21 and the hydraulic cylinder (and the strut 20) and also between the second link 22 and the first link 21. The second link 22 is also pivotally secured to the wing 12 at a suitable location. The mechanism for raising and lowering the wings does not form a part of the present invention and is therefor shown in a diagrammatic way only.

When viewing FIG. 1, it can be appreciated that the central portion 10 and the wings 11, 12 combine to form a frame supported on ground wheel assemblies, the ground wheel assemblies being formed by the pairs 15, 16 of wheels and also by the wing wheels 17, 18. Those skilled in the art will, of course, appreciate that instead of two pairs of wheels 15, 16, a greater number may be used or the pairs of wheels 15, 16, can be substituted by single respective wheels or the like. Both the central portion 10 and the wings 11, 12, are so arranged that a transversely elongate generally rectangular frame is provided which includes, in the case of the central portion 10, a transverse rear beam 23, a transverse front beam 24, a central beam 25 and a longitudinally extending side beam 26, all interconnected to form a generally rigid rectangular structure. Similarly, each wing comprises a transverse rear beam 27, a transverse front beam 28 and the respective side beams 29 and 30.

Figure 2:
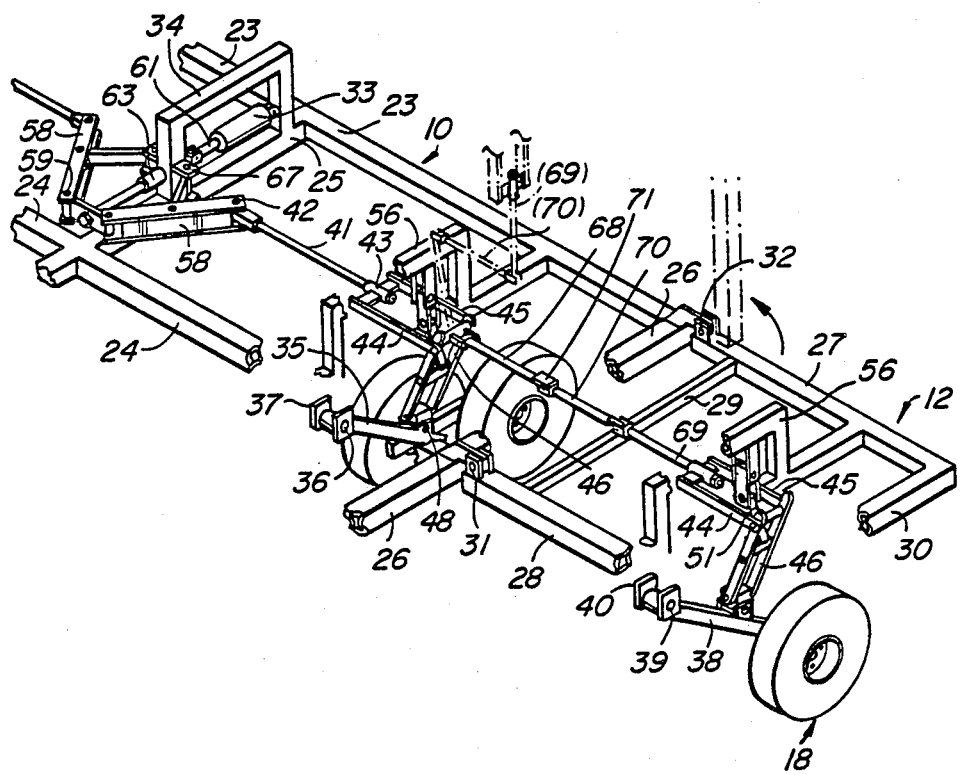
FIG. 2 is a simplified partial view of the implement in FIG. 1, it being understood that the half shown in FIG. 2 has its mirror image counterpart in the other half of the implement (the left-hand half as viewed in FIG. 1)

It may be useful to mention at this point that the representation of FIG. 2 shows only one half of the implement, it being understood that the other half not visible in FIG. 2 is a mirror image of what is shown in FIG. 2.

The central portion 10 and the side wings 11, 12, are pivotally secured to each other for pivotal movement at pivot brackets 31, 32, on actuation of the respective hydraulic cylinders 13, 14, as mentioned before and as is well known in the art.

The present invention provides elevation control means for selectively raising or lowering the ground wheel means 15, 16, 17, 18 relative to the frame as formed by the central portion 10 and wings 11, 12 in response to the actuation of drive means which, in the preferred embodiment, is of the type of a hydraulic cylinder 33 mounted within a longitudinally extending upright rectangular frame 34 which is integral with the central frame portion 10 such that the position of the wheels relative to the frame can be adjusted in vertical position thus raising or lowering the frame as the need may arise. Each of the ground wheel means 15-18 is secured to the respective frame portion by a swing arm. Thus, the wheel means 16 is secured to a swing arm 35 which is pivotal about a journal 36 mounted in a pair of brackets 37 fixedly secured to the central portion 10 of the frame. Similarly, the wing wheel 18 is mounted at a free end portion of a swing arm 38, about a journal 39 in a pair of brackets 40 fixedly secured to the front beam 28 of the wing 12. In other words, each swing arm means is pivotally secured to the frame for pivoting movement about a normally horizontal swing axis extending transversely of the frame.

The actuating movement of the hydraulic cylinder 33 is transmitted to the respective wheels by a mechanism generally referred to as "connection means", in the specific embodiment a "connection rod means" which will now be described in greater detail with reference to FIG. 2. The connection means contains a horizontal and transversely elongated first rod 41 having a first end operatively connected to the drive means at a pivot 42. The second end of the first rod 41 is fixedly secured, at 43, to a first transmission frame having two arms 44, 45 the free ends of which define a pivot joint with a two-arm dependent link 46 (FIG. 4) for relative movement about a generally horizontal first longitudinal axis 47. The other end of the two-arm link 46 is pivotally secured to the swing arm 35 by way of a universal joint 48. The universal joint 48, which is well known per se thus allows relative pivotal movement between the swing arm 35 and the link 46, both about a longitudinal pivot axis 49 and about a transverse pivot axis 50.

The mechanism further comprises a dependent strut link 51 whose upper end is pivotally secured to a member 52 of a universal joint 53, for pivoting about a longitudinal axis 54, the upper part of the member 52 being, in turn, pivotal about a transverse axis 55, defined by depending brackets integral with a raised rectangular section 56 of the frame 10 or wing 12 or 11. The lower end of the strut 51 is pivotally secured to the link 46 at pivot axis 57, disposed at mid-point between the axis 47, 49. The distance between axis 57 and 54 corresponds to the distance 57-47 or to the distance 57-49.

The mechanism of the wing wheel 18 is of generally the same configuration as that of the pair of wheels 16 and is therefore referred to with the same reference numerals.

Figure 4:
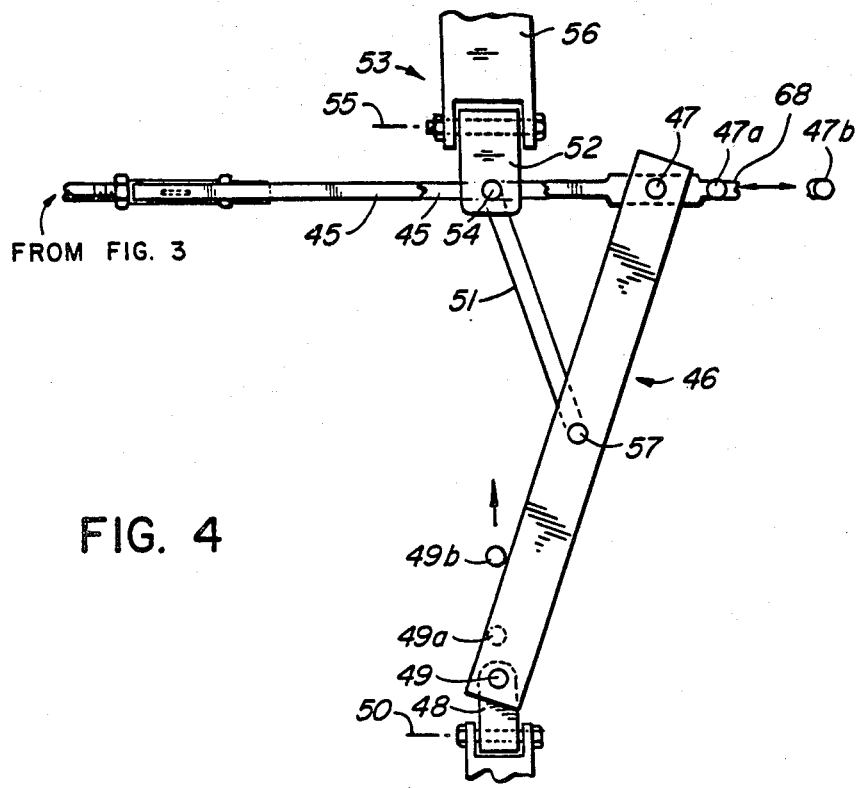
FIG. 4 is a simplified end view of the continuation of the transmission of FIG. 3, to the right thereof.

It will be appreciated on review of FIG. 4 that the above mechanism results in raising or lowering the axis 49 (and thus the respective wheel assembly) from a point shown by reference numeral 49 to points 49a and 49b, as the first rod 41 is displaced horizontally to displace point 47 to the location 47a and 47b. In other words, a generally horizontal transverse movement of the connection means is transmitted to a raising or lowering movement of respective ground wheels relative to the frame.

Figure 3:
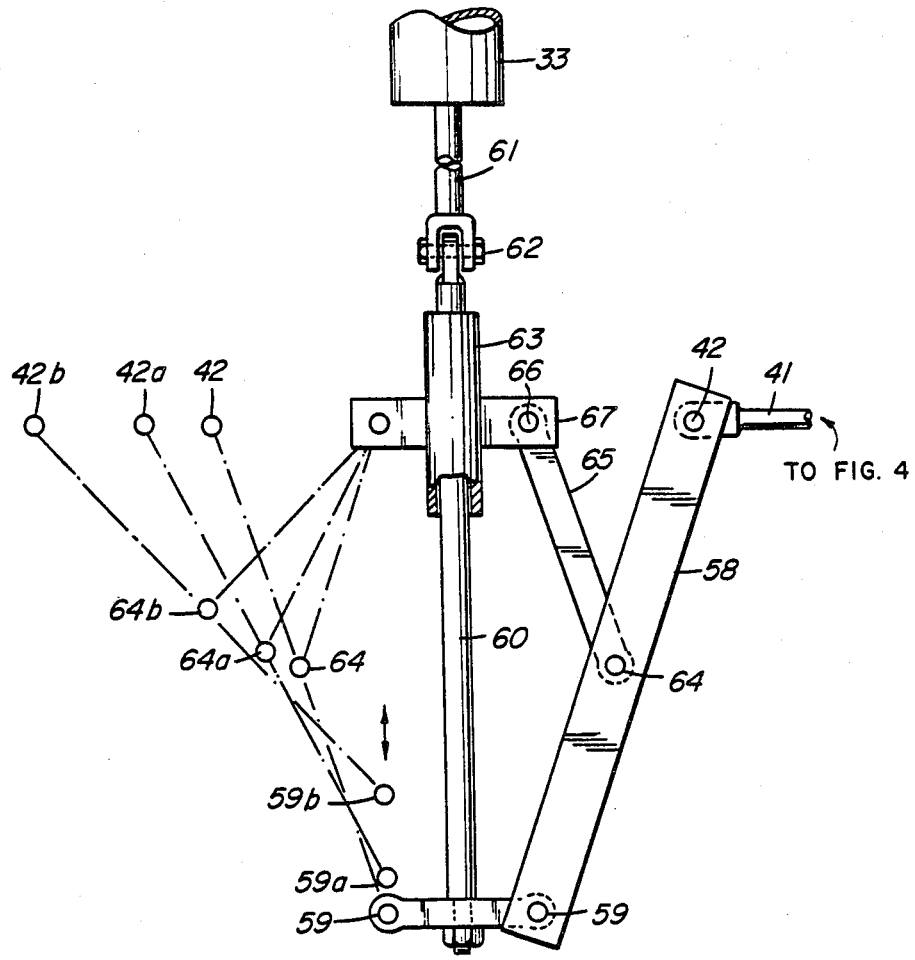
FIG. 3 is a diagrammatic plant view indicative of the transmission of the drive movement of a hydraulic cylinder to the connection rod means.

Referring now back to the introduction of the hydraulic cylinder 33 and referring particularly to FIG. 3, the pivot 42 is disposed at one end of a link 58 whose other end is pivotally secured, at 59 to the free end of a reciprocating rod 60 pivotally secured to a piston rod 61 of the hydraulic cylinder 33 at a joint 62. The rod 60 is slidably received within a bushing 63 fixedly secured to the upright frame 34 as best seen in FIG. 2. At a mid pivot axis 64, one end of a second link 65 is pivotally secured, the opposite end of link 65 being pivotal about a pivot 66 of a bracket 67 fixedly secured to the central frame portion 10, as can be readily appreciated on review of FIG. 2.

The link between 66 and 64 corresponds to either the distance between 64 and 59 or 64 and 42. Accordingly, on actuation of the piston rod 61, the rod 62 reciprocates to bring the pivot axis 59 to its respective positions, from 59, over 59a, to 59b. The same actuation results in the displacement of the axis 64 from 64, over 64a to 64b which, in turn, results in a linear movement of 42, over 42a, to 42b, the latter movement corresponding to the displacement of 47 over 47a to 47b, as referred to above.

Thus, the rod 60 operates with links 58 and 65 to form what is in effect a toggle mechanism. The length of the links of the toggle mechanism corresponds to the length of the arms of the raising mechanism shown to the right of FIG. 3 and described above.

Figure 5:
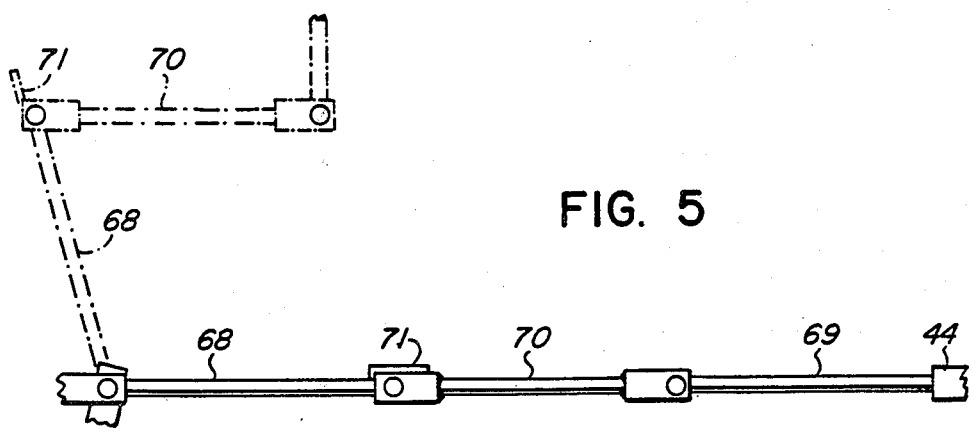
FIG. 5 is a simplified end view of the continuation of the transmission of FIG. 4 to the right thereof showing how the connection rod means folds on raising the respective wing.

Turning now back to FIG. 2 and also referring to FIG. 5, it will be seen that even though the raising or lowering mechanism of the outside wheel 18 is generally identical with the mechanism as described above, the connection means or connection rod means is different in that, the second connection rod means is comprised of a first rod 68 pivotally secured to the link 46, for pivotal movement about an axis 47 (FIG. 4). In other words, the rod 68 can freely pivot about pivot axis 47, both with respect to the arms 44, 45 and with respect to the link 46. The opposite end of the second connecting rod is marked with reference numeral 69 and is fixedly secured to the transmission frame of the wheel having two arms identical in function to the arms 44, 45 and therefore referred to with the same reference numerals. Disposed between the two rods 68, 69, is an intermediate rod 70. The intermediate rod 70 thus forms a link facilitating the folding of the second connection rod means when the wing of the implement is raised as shown in broken lines in FIG. 2, by pivotting the wing about the axis of pivot (31). The proper folding of the rod assembly 68-70-69 is assisted by a plate 71 fixedly secured to the rod 68 at is pivotal joint with the intermediate rod 70. In a fully extended state, the free end of the plate 71 rests on the adjacent part of the intermediate rod 68, thus preventing the downward folding of the joint between 68 and 70. As the wing with the wheel 18 is lifted, the weight of the wheel assembly of 18 causes a force acting on 69, 70 and 68, thus relaxing the tension normally present when the wheel 18 supports the wing on the ground. Since the rod 41 and its associated frame 44 remains under tension (as the wheels 16 remain on the ground), the location of the pivot between 68 and 44 remains unchanged. Eventually, the weight of the wheels causes the rod train 68-70-69 to fold in a generally S-shaped fashion as shown in broken lines of FIG. 5.

The device as described above has been field tested and found to possess satisfactory rigidity while the overall cost of the raising and lowering mechanism was reduced by making it possible to use a great number of mutually exchangable parts of the raising mechanism.

The above notwithstanding, it will be readily appreciated by those skilled in the art that the preferred embodiment can be modified. For instance, the arrangement of the hydraulic cylinder 33, while preferred, can be substituted by a transversely expanding or contracting cylinder. Similarly, even though rod means is preferred for connecting the wheel raising mechanisms with the drive cylinder 33, a modification having a chain or cable is readily conceivable.

The above are but few examples showing that it is possible to depart from the preferred embodiment without departing from the scope of the present invention as set forth in the accompanying claims.

The embodiments of the invention in which an exclusive property or privilege is claimed are defined as follows:

1. A farming implement of the type including a frame supported on ground wheel assemblies and having elevation control means for selectively raising or lowering the ground wheel assemblies relative to the frame in response to the actuation of drive means, to thus selectively adjust the spacing of the frame above the ground, each of said ground wheel assemblies being mounted at one end of a respective swing arm means, the other end of the swing arm means being pivotally secured to the frame for pivoting movement about a normally horizontal swing axis extending transversely of the frame, wherein said elevation control means includes:

(a) connection means operatively associated with said drive means for reciprocating movement generally transversely of said frame, said connection means being further associated with ground wheel lifting and lowering means to transmit the movement of the drive means to the wheel lifting and lowering means, said wheel lifting and lowering means including:

(b) two-arm dependent link means pivotally secured at one end to said connection means for relative movement about a normally generally horizontal first longitudinal axis, the other end of the two-arm link means being pivotally secured to said swing arm means for relative pivotal movement about a normally generally horizontal second longitudinal axis and about a generally horizontal second transverse axis;

(c) dependent strut link means whose one end is pivotally secured to the frame by way of a universal-type joint allowing the pivoting of the strut link means about a normally generally horizontal first joint axis extending longitudinally of the frame, and about a generally horizontal joint axis extending transversely of the frame, the other end of the strut link means being secured to said two-arm link means for relative pivotal movement about a generally horizontal and longitudinal intermediate axis;

(d) the intermediate axis being equidistantly spaced from said longitudinal axes at the ends of the two-arm link means, and from said first joint axis; whereby a generally horizontal transverse movement of the connection means is transmitted to a raising or lowering movement of respective ground wheels relative to said frame.

2. An implement as claimed in claim 1, wherein said elevation control means comprises at least two of said ground wheel lifting and lowering means spaced from each other generally transversely of the frame and operatively associated with the same connection means.

3. An implement as claimed in claim 2, wherein said drive means includes a piston-cylinder motor disposed centrally of the frame and operatively associated with two of said connection means, one at each side of the drive means, said connection means extending transversely of the frame.

4. An implement as claimed in claim 3, wherein the piston-cylinder motor is a hydraulic cylinder disposed for reciprocating movement with a generally horizontal plane.

5. An implement as claimed in claim 4, wherein said hydraulic cylinder is mounted for reciprocating drive movement longitudinally of the frame and is operatively associated with a toggle mechanism for transmitting the drive movement into a transverse movement of said connection means.

6. An implement as claimed in claim 5, wherein said toggle mechanism includes two pairs of toggle links; a first pair of said two pairs being pivotally secured to the frame, the second pair being pivotally secured to a reciprocating portion of said hydraulic cylinder, the respective links of said two pairs being pivotally secured to each other to define a normally horizontally disposed, generally diamond-shaped toggle configuration whose one axis is generally coincident with the axis of said reciprocating drive movement, the link length of each link as measured between respective pivot ends thereof being the same as that of any other of the links forming said two pairs; the links of one of said pair having each an integral extension forming a lever whose free end is pivotally secured to the respective connection means, the length of each lever as measured between the respective pivot joints thereof with the connection means and the pivot joint with the respective link of said first pair being equal to said link length, whereby the displacement of the pivot joints between the toggle mechanism and the connection means is generally linear and perpendicular to the reciprocating drive movement.

7. An implement as claimed in claim 1, wherein said connection means is a connection rod means comprising a normally horizontally and transversely elongated first rod having a first end operatively connected to said drive means, and a second end generally fixedly secured to a first end of a first transmitting frame, the second end of said transmitting frame having two arms defining free end portions housing pivot means of said first axis.

8. An implement as claimed in claim 7, wherein said connection rod means further comprises a second rod means having a driven first end portion pivotally secured to said transmitting frame, for a free pivotal movement about said first axis, the second end portion of said second rod means being generally fixedly secured to a first end of a second transmitting frame disposed to that side of the implement frame which is removed from the drive means.

9. An implement as claimed in claim 8, wherein said second transmitting frame comprises two arms having free end portions housing pivot means of the first axis of a second ground wheel assembly at an extreme wing of the frame of the implement, said extreme wing being remote from said drive means.

10. An implement as claimed in claim 9, wherein said frame of the implement comprises wing raising means for pivoting said extreme wing relative to the remaining part of the implement frame to a generally upright position to reduce the width of the implement for road transportation or the like, the wing of the frame being pivotally secured to said remaining part of the implement frame, for pivotal movement about a wing pivot axis extending longitudinally of the implement frame, said second rod means comprising an intermediate link interposed between the respective end portions of the second rod means and secured to same for pivotal movement about longitudinal link pivot axes, said link being arranged in that section of the rod means which is adjacent to the wing pivot axis to enable the folding of the second rod means on raising of the respective wing.

* * * * *